Oct. 13, 1959 ROGER-PAUL CONGARD 2,908,257
ROTARY INTERNAL COMBUSTION ENGINE
Filed Jan. 13, 1958 5 Sheets-Sheet 1
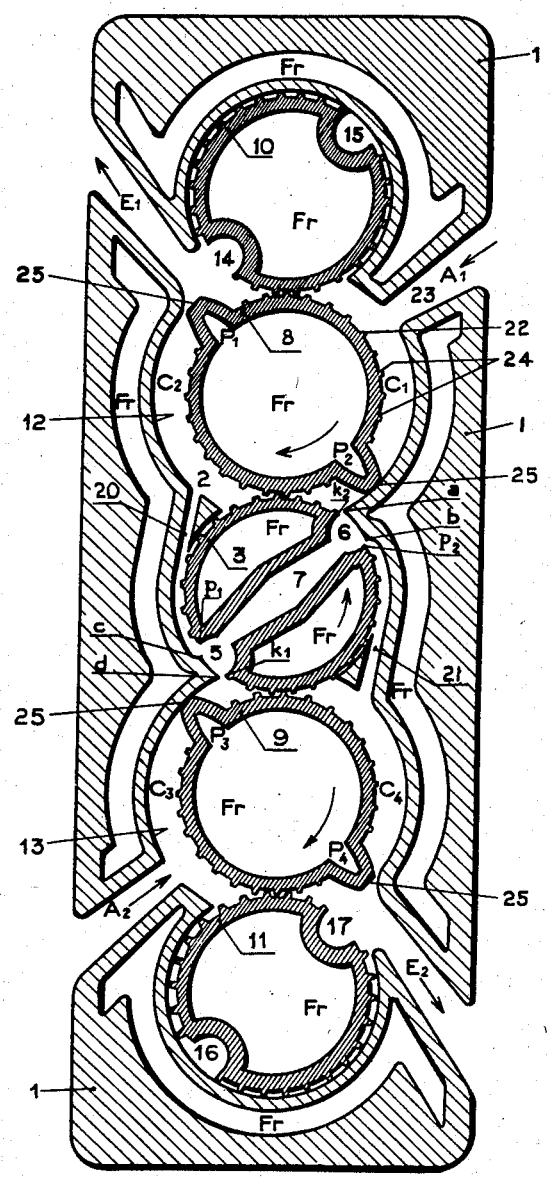
_FIG.1_
INVENTOR.
Roger Paul CONGARD
BY
Toulmin & Toulmin
ATTORNEYS Oct. 13, 1959         ROGER-PAUL CONGARD         2,908,257
ROTARY INTERNAL COMBUSTION ENGINE
Filed Jan. 13, 1958                                 5 Sheets—Sheet 3

XY

ZW

INVENTOR.
Roger Paul CONGARD
BY
Toulmin & Toulmin
ATTORNEYS

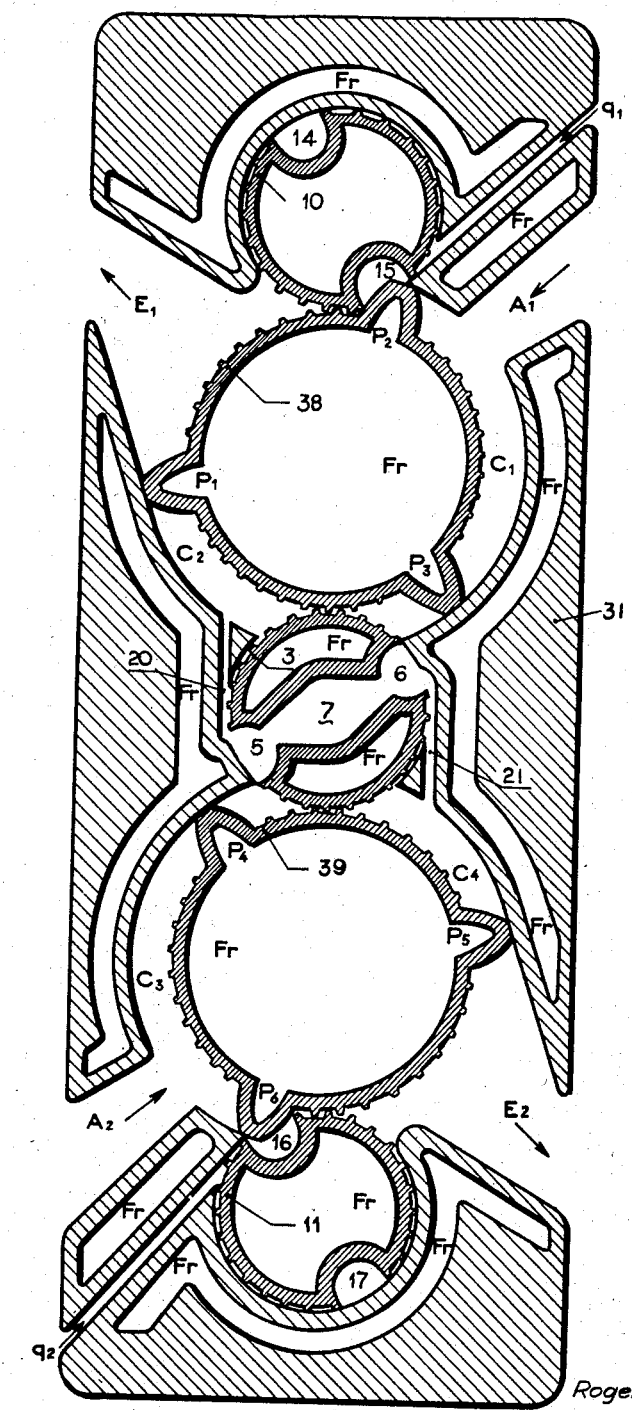
_FIG.5_

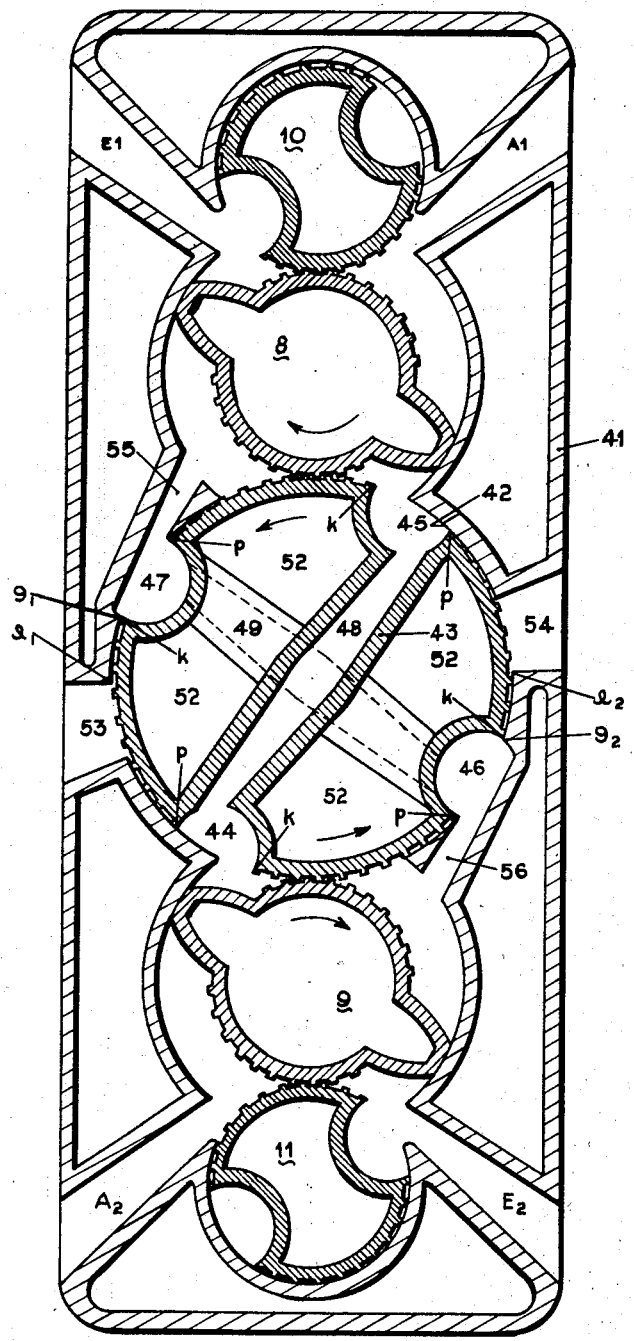
_Fig 6_

United States Patent Office 2,908,257
Patented Oct. 13, 1959

2,908,257

ROTARY INTERNAL COMBUSTION ENGINE

Roger-Paul Congard, Sevres, France, assignor to Institut Francais du Petrole, des Carburants et Lubrifiants, Paris, France Application January 13, 1958, Serial No. 708,462

Claims priority, application France January 12, 1957

15 Claims. (Cl. 123—13)

This invention relates to rotary internal combustion engines.

It is an object of my invention to provide a rotary internal combustion engine which functions safely at high speeds, while possessing a perfect equilibration of all movable parts (rotors) as well as of the forces of compression and expansion, thereby substantially eliminating vibrations during the operation of the engine at high speeds.

It is another object of my invention to provide a rotary internal combustion engine of the aforesaid characteristics, which can furthermore be easily adjusted to a desired compression rate by the exchange of one single rotor.

Rotary internal combustion engines are well known in the art and have been described lately in patent applications Ser. No. 574,833 filed March 29, 1956, now abandoned, the continuation-in-part thereof Ser. No. 688,908 filed October 8, 1957, furthermore in Ser. No. 696,538 filed November 14, 1957, now U.S. Patent 2,870,-752, and Ser. No. 698,291 filed November 22, 1957, all of which are assigned to the same assignee as the present application.

In comparison with the rotary engines described in these prior applications, the rotary internal combustion engine according to my invention provides certain advantages among which is a better flow of the combustible mixture or comburent, as the case may be, to the combustion chamber, and a better flow of the expanding exploded gases from the combustion chamber due to an improved arrangement of the latter in such a manner that the gases penetrate into and leave that combustion chamber without changes of orientation and consequently without losses of flow velocity, either during compression or during expansion.

This is achieved, in contrast to the hitherto described rotary internal combustion engines, by providing, in the rotary engine according to my invention, a single combustion rotor containing a combustion chamber traversing the same in a plane at right angle to the rotor axis, and arranging this combustion rotor intermediate two piston-bearing work rotors, the combustion rotor thus constituting the central rotor of the engine; each of the latter work rotors rotates in a work chamber of substantially cylindrical shape and of such diameter that a light play exists between the internal cylinder wall and the ridges of the lobe-shaped pistons on the work rotor. Each of the work rotors may further cooperate with a sealing gate rotor arranged between the intake and exhaust ports provided for each work chamber.

Further objects and advantages of my invention and details of the construction and operation of the rotary internal combustion engines according to the same will appear from the description thereof in connection with the accompanying drawings in which Figure 1 is a cross sectional view showing schematically an embodiment of the rotary engine according to my invention in a plane perpendicular to the rotor axes;

Figure 1A is an enlarged cross sectional view showing schematically a slightly different embodiment of the rotary engine according to my invention which is particularly suitable for such an engine when the latter is operated with admission of a combustible mixture (carburator-type engine). According to this embodiment scavenging of burnt gases is limited substantially to the combustion chamber and wells of the combustion rotor.

Figure 5 is a cross sectional schematical view of another embodiment of the rotary engine according to my invention;

Figure 6 is a cross sectional schematical view of yet another, preferred embodiment of the rotary engine according to my invention;

Figure 1A:
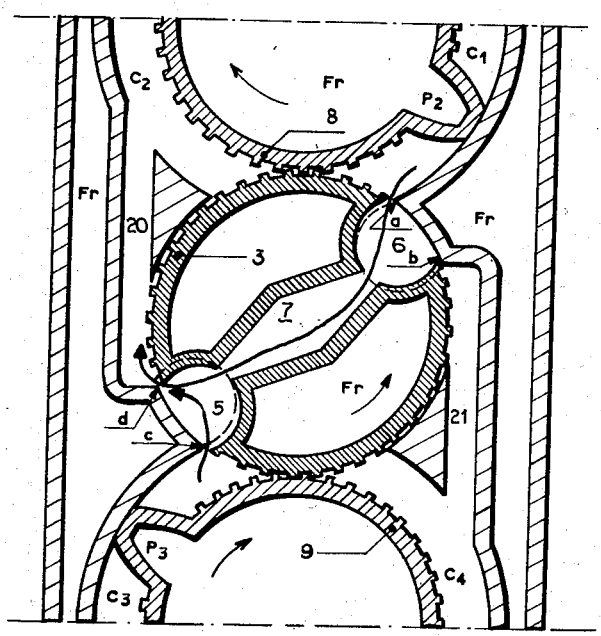

The rotary engine according to the invention, as illustrated by way of example in Figure 1, comprises in an engine block or stator 1, a central combustion rotor 3 housed in a central bore 2 of the stator and rotatably mounted on a shaft (not shown) which is centrally disposed in the bore 2. The combustion rotor 3 is provided in its cylindrical surface 4 with two diametrically disposed vaulted wells 5 and 6 which are connected with each other by a passageway 7 which extends diametrically through the interior of the combustion rotor 3 constituting a combustion chamber in the latter.

In the embodiment of the combustion rotor shown in Figure 1, the profile of the combustion chamber in a plane perpendicular to the rotor axis is substantially that of a flattened lozenge and is disposed in such a manner that each open end $7a$, $7b$ (Fig. 2) of combustion chamber 7 opens toward that side of the corresponding well 5, 6 which will face, during the passage of the pistons $P_1$, $P_2$, $P_3$, $P_4$ of work rotors 8 and 9, the trailing slopes of these pistons against which expansion of the exploded gases is to be effected.

Figure 2:
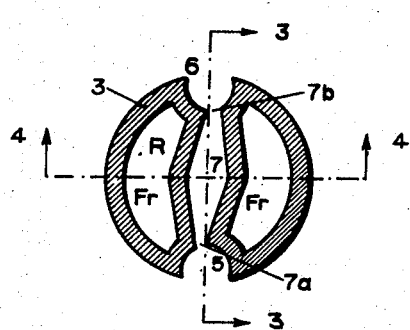
Figure 2 is a cross sectional view of the combustion rotor shown in Figure 1, corresponding to section 2—2 in Figures 3 and 4.
Figure 3:
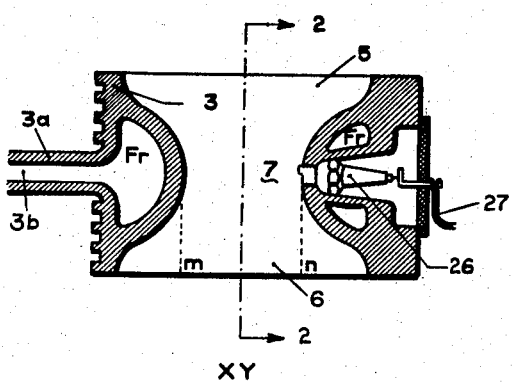
Figure 3 is a longitudinal sectional view of the combustion rotor shown in Figure 2, along line 3—3 therein.
Figure 4:
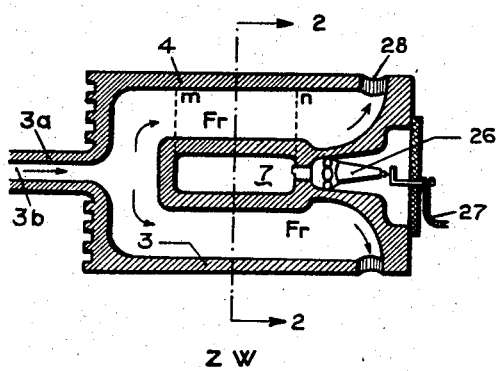
Figure 4 is a longitudinal sectional view of the combustion rotor along line 4—4 in Figure 2.

The profiles of the combustion chamber in the planes passing through the rotor axis at right angle to each other and shown in Figures 3 and 4 are selected dependent on the desired compression rate. Thus, if a higher compression rate is desired it is sufficient to reduce the width $m$—$n$ of combustion chamber 7 while retaining the profile of Figure 2. Width $m$—$n$ of the combustion chamber is the width in axial direction taken in the vicinity of the rotor axis. In a similar manner the compression rate will be higher, if the lozenge constituting the profile of the combustion chamber according to the section of Figure 2, is flatter, the other profiles remaining constant. The rotary pistons $P_1$ and $P_2$ of work rotor 8 and $P_3$ and $P_4$ of work rotor 9 are of a shape and have a profile in the plane of Figure 1, which are selected to provide for an optimal sealing effect during the passage of these pistons through the corresponding wells 5 and 6 of the combustion rotor 3, so that, as far as possible, no gases can pass from one side of the piston to the other well and piston profiles having satisfactory sealing properties, are described in patent application Ser. No. 688,908 supra and constitute no part of my invention.

Each of the work rotors 8 and 9 is mounted on a shaft (not shown). The shafts of the work rotors, the combustion rotor 3 and the sealing rotors 10 and 11 may be alined in parallel with each other and mounted in the stator 1 as shown in Figure 1.

Each of the work rotors 8 and 9 is housed in a substantially cylindrical bore 12, 13 of the stator 1 and mounted co-axially therein, so that the pistons move with a slide play along the internal walls of bore 12 and 13 respectively. The spaces between the work rotors 8 and 9 and the internal walls of their respective bores 12 and 13 each constitute a work chamber which are delimited by the adjacent rotors, namely central rotor 3 and sealing rotor 10 in the case of work rotor 8, and central rotor 3 and sealing rotor 11 in the case of work rotor 9, so that each work chamber is divided into two compartments $C_1$, $C_2$, and $C_3$, $C_4$ respectively. An inlet port $A_1$ provided in stator 1 opens into compartment $C_1$ of the work chamber of bore 12, while an intake port $A_2$ in stator 1 opens into compartment $C_3$ of the work chamber of bore 13. Exhaust ports $E_1$ and $E_2$ in stator 1 open into compartments $C_2$ and $C_4$ respectively. In Figure 1 compartments $C_1$ and $C_3$ thus represent intake and compression chambers while compartment $C_2$ and $C_4$ represent expansion or power and exhaust chambers.

The two gate rotors 10 and 11 each operate as sealing rotors between the corresponding intake-compression compartments $C_1$, $C_3$ on the one hand, and the power-exhaust compartments $C_2$, $C_4$ on the other hand, by tightly sealing off communication between the respective compartments thereby preventing any passage of gas from the intake port directly to the exhaust port. In order to avoid that a certain amount of gas from the intake port passes to the exhaust port by way of one of the wells 14, 15 of sealing rotor 10, or wells 16, 17 of sealing rotor 11, intake ports $A_1$ and $A_2$ open into the intake-compression compartments $C_1$ and $C_3$ substantially at the place in the internal wall of bore 12, 13 which would face one of the pistons when the corresponding well, through which the piston has just passed, ceases to be in communication with the intake-compression compartment in question. However, this arrangement of the intake opening might involve the risk of causing a depression of gases in that part of the intake-compression compartment between the sealing rotor and the intake opening, which depression would also prevail in the well of the sealing rotor, last in communication with the intake-compression compartment. This depression would be caused by the travel of one of the pistons through the last mentioned part of the intake-compression compartment and would augment the momentum of resistance in the engine.

Therefore, channels $q_1$ and $q_2$ are provided in the stator (as shown in Figure 5), each of which establishes communication between the well of a sealing rotor and the adjacent part of the intake compression compartment with the outside atmosphere until the corresponding piston of the work rotor has passed the opening of the intake port in the inner wall of the bore housing the latter. The rotary engine according to my invention further comprises two expansion channels 20 and 21, whereby the expansion of the gases from the combustion chamber can be continued even after the wells of the central combustion rotor ceases to be in direct communication with the power-exhaust compartments due to the relative rotation of the combustion rotor and the two work rotors. These channels are so arranged as to permit, firstly, a maximum expansion "stroke" and, secondly, an effective scavenging of the residual gases in the wells of the combustion rotor, the combustion chamber itself and eventually the expansion channels themselves, as well as if desired the power-exhaust compartments.

Since scavenging is effected by means of a portion of the gases destined for being fed to the combustion chamber for participation in the explosion therein, it is preferable to limit the scavenging to the combustion chamber and the wells of the combustion rotor in those cases where the rotary internal combustion engine is operated with an explosive mixture introduced by way of the intake ports $A_1$ and $A_2$.

In the latter case one of the angular intervals $a$—$b$, and $c$—$d$ (corresponding to arcs on the rotor surface defined by angles taken at the rotor axes in planes perpendicular to the latter), which separates the edge of each opening, respectively, of one of the channels 20 or 21 into the central bore 2 housing the combustion rotor from the adjacent intake-compression compartment $C_1$ or $C_3$, is preferably selected exactly equal to the angular interval (determined in the same manner as the previous intervals) which separates, in a projection on a plane perpendicular to the rotor axis, the two edges diametrically opposed, $p_1$ and $k_1$ (or $p_2$ and $k_2$) of wells 5 and 6 of the combustion rotor 3. The other angular interval, i.e., either $a$—$b$, or $c$—$d$, is selected to be slightly smaller than the first one. This arrangement permits a concurrent scavenging of the combustion chamber inside the combustion rotor as well as a scavenging of the wells as shown by arrows indicating the flow of gases in Figure 1A. The ratio of angular interval $p_1$—$k_1$ (or $p_2$—$k_2$) which corresponds to the width of well 5 (or 6) on the peripheral wall of combustion rotor 3 (in a plane perpendicular to the rotor axis) to that angular interval of intervals $a$—$b$, or $c$—$d$, which is smaller than interval $p_1$—$k_1$, is selected bearing in mind that a compromise is to be found between the need for a satisfactory scavenging of the burnt gases from the combustion chamber and the wells of the combustion rotor and, on the other hand, the necessity of substantially avoiding losses of explosive gas mixture.

If, on the other hand, the rotary internal combustion engine according to the invention is operated as an automatic ignition and fuel injection engine, combustion sustaining fluid (comburent) such as air, is introduced through intake ports $A_1$ and $A_2$. In this case, it may be advantageous to extend the scavenging also to the power-exhaust compartments $C_2$ and $C_4$. For this purpose, each of the aforesaid intervals $a$—$b$, and $c$—$d$, should be chosen slightly smaller than the angular interval corresponding to the above defined width of the wells 5, 6. Scavenging of the wells of the combustion rotor of the expansion channels and if desired of the power-exhaust compartments is then effected during the time interval corresponding to the rotation of the piston rotor 3 about an angle which is equal to the difference between the annular intervals $p_1$—$k_1$ (or $p_2$—$k_2$) and $a$—$b$, as shown in Figure 1. Since one ($a$—$b$ as in Figure 1) is selected to be larger than the other angular distance ($c$—$d$ in the case of Figure 1), all direct communication between compartment $C_1$ and expansion channel 21 will be interrupted as soon as the edge $p_2$ of well 6 passes edge $b$ of the orifice of channel 21 in bore 2. But as the angular distance $c$—$d$ is smaller than the angular distance $a$—$b$, the gases taken in and compressed by piston $p_2$ of work rotor 8 will scavenge the combustion chamber during a short time interval and will expel the burnt gases therefrom toward the expansion channel 21 on the one hand, and from the combustion chamber through channel 20 toward compartment $C_2$ and exhaust port $E_1$ on the other hand, until edge $p_1$ of well 5 of the combustion rotor 3 passes edge $c$ of the orifice of channel 20 in the bore 2, thereby cutting off all communication between intake-compression compartment $C_3$ and expansion channel 20. The arrangement, according to my invention, of a central rotor housing an internal diametrically extending combustion chamber and two work rotors in two work chambers arranged on two opposite sides of the central combustion rotor and two expansion channels located so as to cooperate with the combustion rotor, as described hereinbefore, thus permits successively the following two types of scavenging:

(1) A first scavenging of the wells of the combustion rotor, the expansion channels and the power-exhaust compartment in each of the work chambers in the engine stator by means of the flow therethrough of part of the compressed gases from intake compression compartments $C_1$ and $C_3$, respectively, through wells 6 and 5, expansion channels 21 and 20 and from there to power-exhaust compartments $C_4$ and $C_2$, respectively, until leaving the exhaust ports $E_2$ and $E_1$.

(2) A second scavenging by means of a flow of compressed gases from compartment $C_1$ through well 6, combustion chamber 7 and well 5 where the gases join those coming from compartment $C_3$ to be evacuated together with the latter through expansion channel 20, compartment $C_2$ and exhaust port $E_1$.

Again, the ratios of angular intervals $c$—$d$ and $a$—$b$ to angular interval $p_1$—$k_1$ (which is equal to $p_1$—$k_2$ and corresponds to the width of wells 5, or 6, as defined above) are selected so as to obtain a compromise between the need for a satisfactory scavenging of the burnt gases and that of avoiding excessive losses of comburent.

According to a further important feature of the invention, the cylindrical surfaces of all rotors are covered with a system of grooves and ribs which permits to obtain a tight sealing effect between these rotors. Consequently, tight sealing is achieved between the intake-compression compartments on the one hand and the power-exhaust compartments on the other hand. By providing on the cylindrical surfaces of the central combustion rotor, the work rotors (except where the latter bears the pistons) and the sealing rotors, a great number of the aforesaid grooves and ribs in such a manner that the ribs from one of the rotors pass through the interspace or groove formed between two ribs of the next adjacent rotor while maintaining always a slight play and thus forming between the rib and groove systems of the two rotors a kind of labyrinth sealing, which causes a turbulence of the gases that leads to high losses of velocity and thereby prevents passage of gases from the compartments of higher pressure to the compartments of lower pressure. Thereby a satisfactory sealing is achieved between the rotors without the need of mechanical contact and consequent friction between the rotors and without the necessity of providing for any lubrication. A system of this type is described in the patent application No. 688,908 supra. It will be understood that this system of grooves and ribs is not destined to play in any way the part of a gear assembly since a narrow, free space must remain in labyrinth form between the rotors.

According to a particular feature of my present invention, I prefer to provide the grooves 22 and ribs 23 with at least one lateral surface 24 which is slightly inclined at an oblique angle relative to the plane passing through the axis of the corresponding rotor. In the case of work rotors 8 and 9, this inclination is provided in such a manner that it leads to the return of the gases in the grooves 24 toward the intake-compression compartments $C_1$, $C_3$. In Figures 1 and 5 the profile of these grooves 22 and ribs 23 in a plane perpendicular to the rotor axes is shown in a dimension which is considerably exaggerated relative to the dimensions of the rotors so as to demonstrate more clearly the manner in which the grooves of one rotor cooperate with those of another to effect the desired labyrinth-type sealing.

The ridges 25 of the pistons of the work rotors 8 and 9 may also be provided with a system of narrow grooves extending in axial direction, which grooves, however, are not shown. These grooves cause a labyrinth-type sealing effect when moving along the internal wall of the bore housing the corresponding rotor and thus prevents substantial losses of gas from one side of the piston to the other side.

Since the aforesaid grooves and ribs are only destined as sealing means and not to perform any mechanical transmission of power, synchronization of the movements of the different rotors is assured by an external system of gears not shown in the drawings. Such systems are, for instance, described in patent application 688,908 supra. The combustion chamber 7 in the interior of combustion rotor 3 is provided with either a spark plug 26 and electrical system 27 therefor, as shown in Figures 3 and 4, when the rotary engine according to my invention is to be used as a carburetor-type engine, or, when the machine is used as an engine of the fuel injection type, this spark plug 26 will be replaced by a fuel injector. In the latter case, air or a similar comburent will be introduced through intake ports $A_1$ and $A_2$ instead of the explosive mixture introduced through these ports as in the former case.

The stator 1 as well as all rotors are preferably cooled internally by circulating through passages $Fr$, provided therein for this purpose, a coolant such as water. The rotors are preferably cooled by introducing the coolant in axial direction, for instance, through shaft $3a$ of combustion rotor 3, which shaft has a central passage $3b$ for the coolant (Figures 3 and 4). Since the space occupied by the combustion chamber 7 in the central piston rotor 3 is relatively small compared with the total volume of that rotor, the coolant is provided with a passage cross-sectional area which is sufficient to achieve an effective cooling of the combustion chamber. The coolant leaves the rotor, for instance, through peripheral openings 28, as shown in Figure 4.

The embodiment of a rotary internal combustion engine according to my invention and as illustrated in Figure 5 is distinguished from that shown in Figure 1, in that each work rotor 38 and 39 is provided with three pistons $P_1$, $P_2$, $P_3$, and $P_4$, $P_5$, $P_6$, respectively. Otherwise, apart from the above mentioned channels 18 and 19, the stator 31 of this embodiment is similar to stator 1, shown in Figure 1.

In a similar manner, all other rotary internal combustion engines fall within the scope of the present invention, even though they may possess a different number of rotors, provided that they comprise a central combustion rotor arranged between two work rotors cooperating therewith.

Therefore, a central combustion rotor having more than one pair of diametrically opposed wells provided in its interior, each of which pairs is connected with a diametrically arranged combustion chamber in the interior of the rotor in communication with the other combustion chambers therein, falls also within the scope of my invention.

An embodiment comprising this type of combustion rotor is illustrated in Figure 6. The central combustion rotor 43 housed in a bore 42 of stator 41 is provided with two pairs of diametrically opposed wells 44, 45, and 46, 47, which pairs are arranged so that each well is spaced by an angle, taken at the rotor shaft, of 90° relative to the next adjacent wells in the peripheral wall of the combustion rotor. Diametrically opposed wells 44 and 45 are interconnected by a diametrically disposed combustion chamber 48, while wells 46 and 47 are interconnected by a second combustion chamber 49, which also extends diametrically through the interior of combustion rotor 43, however, in a different plane perpendicular to the rotor axes than combustion chamber 48. Each of the combustion chambers has, in the plane passing therethrough at right angles to the rotor axes, the profile of a flattened lozenge. The two combustion chambers thus formed in the interior of the combustion rotor 43 are not in communication with each other and their sections in planes passing through the axes of the central combustion rotor are preferably superposed, as shown in the sectional view of the central rotor in Figure 7.

Figure 7:
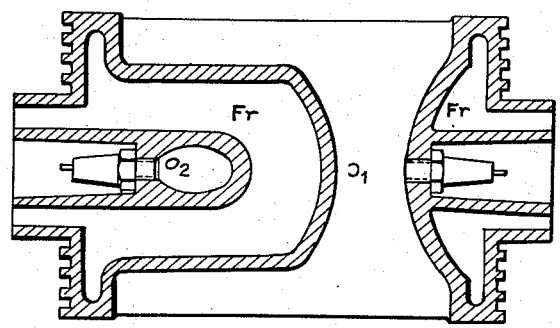
Figure 7 is a sectional view of the central combustion rotor comprised in the embodiment shown in Figure 6.

It will be noted that the work rotors and the sealing rotors cooperating therewith all have the same diameters. The coolant may enter these rotors and leave the same axially through bores provided in the shafts of these rotors, while due to the provision of ignition means such as spark plugs or fuel injectors in one end face of the combustion rotor, the coolant may enter the latter rotor through the hollow shaft of the same, but must leave the rotor through the peripheral opening mentioned hereinbefore. Since, in the embodiment shown in Figures 6 and 7, the combustion rotor is provided with two superposed combustion chambers, it is necessary to use each of the two end faces of this combustion rotor 43 to house therein an ignition means 50, 51 (Figure 7). Influx and outflow of the coolant to and from the cooling space 52 provided in the interior of combustion rotor 43, therefore, takes place through orifices arranged in a ring about the centers of the end faces of the combustion rotor, which are occupied by the spark plug or fuel injector, as the case may be (Figure 7).

The embodiment shown in Figure 6 further comprises two scavenging channels 53 and 54 leading from the bore 42 housing the combustion rotor 43 to the outside of stator 41, and extending at least over a central portion of bore 42 in axial direction, so as to communicate successively with all of the four wells 44, 47, 45 and 46 of combustion rotor 43. These channels 53 and 54 serve for scavenging these wells as well as the combustion chambers 48, 49, respectively, scavenging gas being admitted through channel 53 and leaving stator 41 through channel 54. These channels are preferably so arranged as to open into bore 42 (Figure 6) with their edges $l_1$, $l_2$ at distances (projected into a plane perpendicular to the rotor axes) from the edges $q_1$ and $q_2$ of the orifices of expansion channels 55 and 56 which are slightly smaller than the peripheral widths $k—p$ of wells 44, 45, 46 and 47 of central combustion rotor 43. This arrangement has the advantage of permitting to scavenge one of the expansion channels 55 or 56, while one of the wells of combustion rotor 43 establishes communication during a short time interval between the scavenging gas feeding channel 53 and the neighboring expansion channel 55 and of facilitating the removal of the burnt gases contained in the other expansion channel 56 by establishing therein for a short time communication with the pressure of the surrounding atmosphere, while another well of the combustion rotor establishes communication between the latter expansion channel 56 and the escape channel 54 for the scavenging gases. By inverting the direction in the flow of the scavenging gases through channels 53 and 54, it becomes possible to alternatively and successively scavenge each of the expansion channels 55 and 56 while the other channel is simply placed in communication with the pressure of the surrounding atmosphere.

It is, of course, possible to replace each expansion channel in the various embodiments of rotary engines according to the present invention by a plurality of channels which are substantially disposed in the same manner in projection in a plane perpendicular to the rotor axes but located in different parallel planes, thus achieving eventually a better distribution of the expansion forces in axial direction over the entire surfaces of the trailing slopes of the pistons of work rotors 8 and 9 or 38 and 39, respectively.

Furthermore, it is possible to vary in a general manner the respective dimensions of the different rotors, always providing that they rotate without friction between each other. The latter condition implies that the ratio of the diameters of every two work rotors to the diameter of the combustion rotor located therebetween must be equal to the ratio of the number of pistons of the work rotors to the number of wells of the combustion rotor. The dimension of the pistons and wells can equally be chosen at will, so as to obtain operation of the engine with optimal efficiency.

The operation of the rotary engines according to the invention shall now be described by way of example with the aid of the embodiment thereof illustrated in Figure 1 and using the same as a carburetor type rotary engine.

The central combustion rotor 3 is set in motion in counterclockwise direction (as seen in the view in Figure 1) with the aid of a small starting motor (not shown) acting upon, for instance, the shaft of rotor 3 and causing simultaneously work rotors 8 and 9 to rotate in clockwise direction due to the action of the external gear system (not shown). Pistons $P_2$ and $P_3$ are then displaced in compartments $C_1$ and $C_3$, respectively, and draw explosive gas mixtures into the latter compartments through intake ports $A_1$ and $A_2$. As pistons $P_2$ and $P_3$ pass through wells 6 and 5 of combustion rotor 3, respectively, the explosive gas mixtures will become enclosed in compartments $C_1$ and $C_3$ and as soon as pistons $P_1$ and $P_4$ have passed, respectively, intake ports $A_1$ and $A_2$, these pistons will compress the explosive mixtures in compartments $C_1$ and $C_3$ between their leading slopes, and the wall of the combustion rotor 3; while these pistons draw in behind their trailing slopes new charges of explosive gas mixture. The first mentioned charges of explosive mixture will continue to be compressed between pistons 1 and 4, respectively, and the peripheral wall of rotor 3 until wells 5 and 6 of the latter rotor establish communication between compartments $C_1$ and $C_3$ on the one hand and expansion channels 21 and 20, respectively, on the other hand. A first portion of the compressed gases will then expel residual gas remaining from the previous combustion in the wells, the expansion channels and eventually the compartments $C_2$ and $C_4$, toward the exhaust ports $E_1$ and $E_2$. At this time the positions of pistons $P_2$ and $P_3$ will be such that they uncover the orifices, in bores 12 and 13, of exhaust ports $E_1$ and $E_2$, respectively, thereby establishing direct communication between the latter and compartments $C_2$ and $C_4$ as soon as wells 5 and 6 of rotor 3 enter into communication with compartments $C_1$ and $C_3$.

As soon as communication between well 5 and combustion channel 21 ceases, a part of the compressed gas from compartment $C_1$ will expel the residual gases present in combustion chamber 7, by way of expansion channel 20, compartment $C_2$ and exhaust port $E_1$ due to the fact that communication is still maintained for an instant between well 6 of rotor 3 and expansion channel 20. As soon as communication between the latter two spaces ceases, the compressed gases contained in the compression regions of compartments $C_1$ and $C_3$ are accumulated in the combustion chamber 7, wherein they are further progressively compressed. This part of the operation of the rotary engine embodiment shown in Figure 1 is similar to that of the embodiment shown in Figure 1A with the exception that scavenging in the latter case is limited to the combustion chamber and to the wells of rotor 3.

As the next following step in the operation, the compressed gas in combustion chamber 7 is now ignited by means of a spark plug, preferably with a certain advance so that the gas attains therein maximum compression as pistons $P_1$ and $P_4$ penetrate completely into wells 5 and 6 of rotor 3, respectively. The expansion of the gases is then effected first, directly by way of wells 5 and 6 and then indirectly by way of expansion channels 21 and 20 so that they exert their driving force on pistons $P_1$ and $P_4$ until the latter uncover the orifices of exhaust ports $E_1$ and $E_2$ in the internal walls of bores 12 and 13, respectively. During their travel through compartments $C_2$ and $C_4$, pistons $P_1$ and $P_4$ simultaneously expel through ports $E_1$ and $E_2$ the residual gases still present in these compartments from the last preceding combustion.

During the expansion of the gases acting on pistons $P_1$ and $P_4$, the other two pistons, $P_2$ and $P_3$, compress forward their leading slopes, the next following charges of explosive gas previously drawn into compartments $C_1$ and $C_3$ behind the trailing slopes of $P_1$ and $P_4$. These compressed gas charges will serve in part for scavenging the wells and combustion chamber of rotor 3 and eventually the expansion channels and the power-exhaust compartments, and partly they will serve to fill the combustion chamber 7 with the next following charge of explosive gas mixture. This new charge is then compressed into a combustion chamber and ignited by means of a spark plug in such a manner that the highest compression rate is attained by the gases, when pistons $P_2$ and $P_3$ penetrate to the fullest degree possible into their corresponding wells 6 and 5 of rotor 3 (position of upper dead center in a multi-stroke internal combustion engine of conventional construction). The work cycle of expansion, scavenging and recharging of the combustion chamber is then repeated.

The rotary internal combustion engines according to my invention offer a number of advantages over those rotary engines hitherto described in the art. They are simpler to manufacture and simpler to operate; they show a perfect dynamic balance of all moving pieces (rotors) as well as all the forces of compression and expansion, thereby permitting largely to eliminate vibrations of the engine. Other advantages reside in the facilitation of cooling whereby dilatations of the combustion rotor remain very limited so that, in turn, the slight play required between the rotors, in the cold, can be reduced to a minimum, so that also the losses of gases through the labyrinth-type sealings are kept at a minimum. Another important advantage resides in the possibility of varying the volume of the combustion chamber of the central rotor and thereby adjusting, at will, the compression rate to be achieved in the rotary engine by simply exchanging combustion rotor alone and retaining all other parts of the engine in their original assembly. Furthermore, the expansion or power stroke is of satisfactory length and a large power-to-mass ratio of the engine is achieved. Scavenging of the residual gases is particularly effective since the combustion chamber can be traversed by the scavenging medium in a straight flow.

The rotary engines according to my invention may be operated at very high speeds which become possible due to the direct vibration of the explosive gases or comburents into the combustion chamber and by their equally direction of expansion which is not slowed down due to the fact that the flow of the newly charged and expanding gases is free from changes of direction during the compression or expansion periods, while changes of direction necessary in the hitherto described engines always cause a certain lamination effect of the gases along the walls enclosing the same. Other advantages of the rotary engines according to my invention comprise a most efficient utilization of the expansion forces due to the fact that these driving forces are exerted always on the same slope of each piston as soon as the latter reaches a position corresponding to top dead center, and that expansion is subsequently prolonged always on the same slope of the piston during the entire expansion course. Finally, the rotary engines according to my invention do not require valves and practically no lubrication.

It will be understood that this invention is susceptible to modification in order to adapt it to different usages and conditions and, accordingly, it is desired to comprehend such modifications within this invention as may fall within the scope of the appended claims.

What I claim is:

1. In a rotary internal combustion engine comprising a stator having a plurality of axially parallel bores intersecting each other, a central combustion rotor housed in one of said bores, and having a substantially cylindrical shape, said combustion rotor having at least one pair of diametrically opposed wells in the surface thereof, and a combustion chamber connecting the two wells of said pair with each other and extending diametrically through the interior of said rotor, two substantially cylindrical work rotors housed on opposite sides of said combustion rotor for cooperation therewith, in bores adjacent the bore housing the latter rotor, at least two pistons protruding from the cylindrical surface of each of said work rotors to such an extent as to rotate in each of said bores housing said work rotors with a slight play between the ridges of said pistons and the internal walls of said last mentioned bores, at least one substantially cylindrical sealing rotor associated with each of said work rotors and each housed in one of said bores intersecting the bore which houses the corresponding work rotor, said sealing rotor having at least two wells diametrically opposite each other in the cylindrical surface thereof, and destined for the passage of said pistons of said work rotor therethrough, all of said rotors being arranged with their axes parallel to each other, a plurality of axially extending grooves being provided in the cylindrical surfaces of each of said work rotors, sealing rotors and central combustion rotor, forming a labyrinth-type sealing system in cooperation with similar sealing means provided on the cylindrical surface of each adjacent rotor, the annular space intermediate the cylindrical surface of each work rotor and the inner wall of the bore housing the latter being subdivided by the labyrinth-type seal formed by said work rotor with said combustion rotor, on the one hand, and with said sealing rotor, on the other hand, into two compartments, and an inlet port and an outlet port provided in said stator for each of said work rotors, said inlet port opening into one of said compartments of said annular space, destined to comprise an intake and a compression zone of gaseous fluid therein, and said outlet port opening into the other of said compartments destined to comprise an expansion and an exhaust zone therein.

2. In a rotary internal combustion engine comprising a stator having a plurality of axially parallel bores intersecting each other, a central combustion rotor housed in one of said bores, and having a substantially cylindrical shape, said combustion rotor having at least one pair of diametrically opposed wells in the surface thereof, and a combustion chamber connecting the two wells of said pair with each other and extending diametrically through the interior of said rotor, two substantially cylindrical work rotors housed on opposite sides of said combustion rotor for cooperation therewith, in bores adjacent the bore housing the latter rotor, at least two pistons protruding from the cylindrical surface of each of said work rotors to such an extent as to rotate in each of said bores housing said work rotors with a slight play between the ridges of said pistons and the internal walls of said last mentioned bores, at least one substantially cylindrical sealing rotor associated with each of said work rotors and each housed in one of said bores intersecting the bore which houses the corresponding work rotor, said sealing rotor having at least two wells diametrically opposite each other in the cylindrical surface thereof, and destined for the passage of said pistons of said work rotor therethrough, all of said rotors being arranged with their axes parallel to each other, a plurality of axially extending grooves being provided in the cylindrical surfaces of each of said work rotors, sealing rotors and central combustion rotor, forming a labyrinth-type sealing system in cooperation with similar sealing means provided on the cylindrical surface of each adjacent rotor, the annular space intermediate the cylindrical surface of each work rotor and the inner wall of the bore housing the latter being subdivided by the labyrinth-type seal formed by said work rotor with said combustion rotor, on the one hand, and with said sealing rotor, on the other hand, into two compartments, an inlet port and an outlet port provided in said stator for each of said work rotors, said inlet port opening into one of said compartments of said annular space, destined to comprise an intake and a compression zone of gaseous fluid therein, and said outlet port opening into the other of said compartments destined to comprise an expansion and an exhaust zone therein, and expansion channel means provided in said stator and each connecting freely communicatingly said bore housing said central combustion rotor with one of said expansion and exhaust zone-comprising compartments, each of said channel means opening into said last mentioned bore on the same side, relative to a dividing plane through the axes of the combustion rotor and the work rotor forming the respective compartment, as the latter compartment, and at such a place that the expansion of gaseous fluid can continue by way of said channel means until the last mentioned compartment is brought into communication with the respective exhaust port due to the piston driven by the expansion passing the same exhaust port.

3. A rotary engine as described in claim 1, wherein the total number of sealing rotors is two, one of which is located on that side of each work rotor which is opposite said combustion rotor; wherein said combustion rotor is provided with one pair of diametrically opposite wells and a single combustion chamber interconnecting said wells by extending diametrically through the interior of said combustion rotor; and wherein each of said work rotors bears two diametrically opposed pistons and each of said sealing rotors has two diametrically opposed wells, the shapes of the pistons and all the wells being such as to provide a maximum sealing effect between the gases on both sides of the pistons during the passage of the latter through the wells.

4. A rotary engine as described in claim 2, wherein said channel means comprise two expansion channels, each of which has an opening in the bore housing the combustion rotor, and wherein the edge of said opening of each channel nearest to the intake-compression zone-comprising compartment on the same side of said dividing plane on said channel is located at such distance D from the intersection of the latter compartment with the bore housing said combustion rotor, that the distance of the angle taken at the axis of the combustion rotor in a projection plane perpendicular to the axis of the latter along the periphery of the latter is up to the same length as the width W of the wells of said combustion rotor in the same projection plane.

5. A rotary engine as described in claim 4, wherein the aforesaid distance D of one of said expansion channels is exactly equal to the aforesaid width W of said combustion rotor wells, while the distance D of the other expansion channel is smaller than said width W.

6. A rotary engine as described in claim 4, wherein the distances D of said two channels are both slightly smaller than the width W and different from each other.

7. A rotary engine as described in claim 1, wherein said combustion chamber is so shaped that the profile of the same in a plane perpendicular to the combustion rotor axis is substantially a lozenge.

8. A rotary engine as described in claim 1, wherein said combustion chamber has an opening in each of said combustion rotor wells connected with each other by said combustion chamber, said opening being located in the wall of said combustion rotor well facing that side of the pistons passing through said well which is to be subjected to the expansion of gaseous fluid exploded in said combustion chamber.

9. A rotary engine as described in claim 1, wherein the total number of sealing rotors is two, one of which is located on that side of each work rotor opposite said combustion rotor, and each sealing rotor having two diametrically opposed wells, wherein said combustion rotor is provided with two pairs of diametrically opposed wells, all of said wells being evenly circumferentially distributed about the cylindrical surface of said rotor, said combustion rotor further housing two separate combustion chambers, each of which connects the two diametrically opposed wells of a pair, wherein each of said work rotors and of said sealing rotors is of half the diameter of said combustion rotor, and each work rotor bears two diametrically opposite pistons adapted for passage, successively, through a well of said combustion rotor and a well of said sealing rotor located on the side of said work rotor, opposite said combustion rotor.

10. A rotary engine as described in claim 2, further comprising scavenging channel means for feeding and leading off externally scavenging fluid to and from said bore housing said combustion rotor, said scavenging channel means opening into said combustion rotor bore at such distances from where said expansion channel means open thereinto, on the same side of said divisional plane, that the shortest distance therebetween taken in a projection plane at right angles to the combustion rotor axis, is slightly smaller than the width of either well of said combustion rotor taken in the same projection plane.

11. A rotary engine as described in claim 1, wherein the total number of said sealing rotors is two, each having two diametrically opposed wells in the cylindrical surface thereof and having the same diameter as said combustion rotor, one of which is located on that side of each work rotor which is opposite said combustion rotor; wherein said combustion rotor is provided with one pair of diametrically opposed wells and a single combustion chamber interconnecting said wells by extending diametrically through the interior of said combustion rotor; and wherein each of said work rotors is of 1.5 times the diameter of said central rotor, and bears three pistons distributed evenly under angles of 120° about the cylindrical surface of said work rotor, said pistons being adapted for successive passage through a well of said combustion rotor and a well of said sealing rotor.

12. A rotary engine as described in claim 1, further comprising at least one ignition means arranged in said combustion rotor coaxially therewith and adapted to ignite an explosive gas mixture in the interior of said combustion chamber.

13. A rotary engine as described in claim 12, further comprising means for introducing a coolant axially into said combustion rotor and passage means provided therein for the flow of said coolant therethrough.

14. A rotary engine as described in claim 9, wherein said combustion rotor has two end faces perpendicular to the rotor axis, and comprises two ignition means axially located one in each of said end faces and adapted for igniting an explosive gas mixture in the combustion chamber next adjacent said end face; means for the introduction of coolant into said combustion rotor radially from the outside thereof, and passage means provided therein for the flow of said coolant therethrough.

15. In a rotary internal combustion engine comprising a stator having a plurality of axially parallel bores intersecting each other, the combination of a central combustion rotor housed in one of said bores, and having a substantially cylindrical shape, said combustion rotor having at least one pair of diametrically opposed wells in the surface thereof, and a combustion chamber connecting the two wells of said pair with each other and extending through the interior of said rotor, two substantially cylindrical work rotors housed in bores adjacent the bore housing said combustion rotor on opposite sides of said combustion rotor and each cooperating with the latter in an axially extending zone, at least two pistons protruding from the cylindrical surface of each of said work rotors to such an extent as to rotate in each of said bores housing said work rotors, at least one substantially cylindrical sealing rotor associated with each of said work rotors and each housed in one of said bores intersecting the bore which houses the corresponding work rotor, said sealing rotor having at least two wells diametrically opposite each other in the cylindrical surface thereof, and destined for the passage of said pistons of said work rotor therethrough, all of said rotors being arranged with their axes parallel to each other, the annular space intermediate the cylindrical surface of each work rotor and the inner wall of the bore housing the latter being subdivided by the zone of cooperation of said work rotor with said combustion rotor, on the one hand, and with said sealing rotor, on the other hand, into two compartments, and an inlet port and an outlet port provided in said stator for each of said work rotors, said inlet port opening into one of said compartments of said annular space, destined to comprise an intake and a compression zone of gaseous fluid therein, and said outlet port opening into the other of said compartments destined to comprise an expansion and an exhaust zone therein.

No references cited.